March 20, 1928.
E. A. KROH
1,663,500
CLEAR VISION DEVICE FOR AUTOMOBILE WINDSHIELDS
Filed March 24, 1927
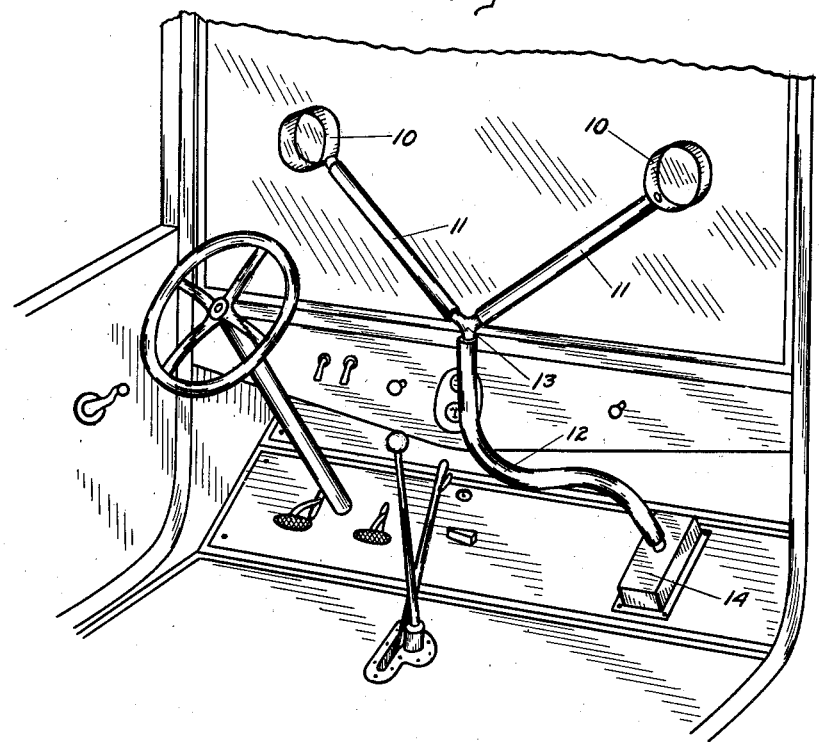
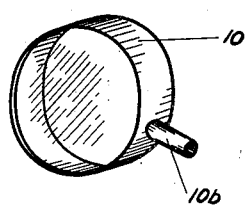
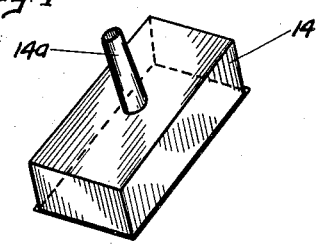
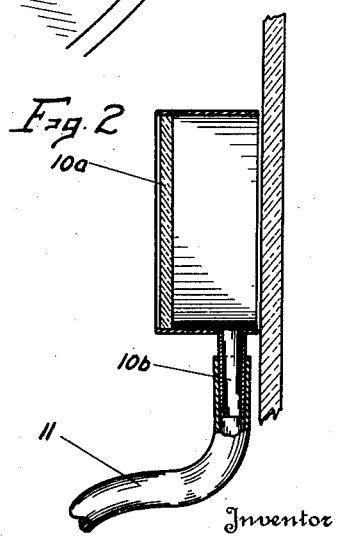
Inventor
E. A. KROH.
By Emil F Lange
Attorney Patented Mar. 20, 1928.

1,663,500

UNITED STATES PATENT OFFICE.

EDWARD A. KROH, OF STELLA, NEBRASKA, ASSIGNOR OF ONE-HALF TO L. L. POE, OF LINCOLN, NEBRASKA.

CLEAR-VISION DEVICE FOR AUTOMOBILE WINDSHIELDS.

Application filed March 24, 1927. Serial No. 178,069.

My invention relates to clear vision devices which are designed for facilitating vision through the wind shields of automobiles. The object of my invention is the provision of a device which will conduct heated air to selected spots on the wind shield of an automobile to thereby keep the wind shield at the selected spots free from water, mist and frost to thereby enable the driver to have a clear and unobstructed view without the necessity of recourse to wind shield wipers and like devices.

Having in view these objects and others which will be pointed out in the following description, I will now refer to the drawings, in which Figure 1 is an illustration showing a portion of the interior of an automobile and showing my device in its assembled form and in its relation to the wind shield of the automobile.

Figure 2 is a sectional view showing the relation of one of the annuli to the wind shield of the automobile.

Figure 3 is an illustration of one of the annuli.

Figure 4 is an illustration of a device which may be connected with the car heater to receive the heated air from whence it is conducted to the two annuli.

My invention consists of a device for receiving and conducting heated air to selected spots on the wind shield of an automobile. The device consists of two annuli 10, of conductors 11 and 12 and of means for initially receiving the heated air. Each annulus 10 is preferably formed from sheet metal with a glass disc 10ª secured therein, the annulus being further provided with a nipple 10ᵇ for receiving the end of a conductor 11. The two conductors 11 and the conductor 12 are formed by cutting hose or tubing into suitable lengths and they are connected by means of a Y-shaped connector 13. The tubing of which the conductors 11 and 12 is formed usually has a slight twist so that by turning it on the nipple 10ᵇ and on the connector 13, it is possible to position the annulus 10 against the wind shield with its entire free edge in contact with the glass of the wind shield.

The use is obvious from the illustrations. The heated air is conducted through the conductor 12 and through the branch conductors 11 and into the annuli 10 where it seeps out at the edges of the annuli and in contact with the glass of the wind shield. Each annulus is large enough to permit clear and unobstructed vision therethrough and the two annuli may be so positioned against the wind shield as to permit both occupants of the front seat to see through the wind shield. In certain cases it may be desirable to position the two annuli 10 close enough together so that the driver has the use of both annuli.

It is obvious that the conductor 12 may receive the heated air at any one of several places in the automobile. Merely by way of illustration I have shown one of these connections in my drawings. The box-like structure 14 is made substantially in the form and size of the heater in the car so as to cover the heater. It is provided with a nipple 14ª for receiving the end of the conductor 12. The heated air could, however, be taken from the manifold or from the radiator or from any one of several other places and the receiving element 14 must of necessity be modified accordingly.

The device has been tried out thoroughly in various kinds of weather and has been found to effectively remove moisture from both sides of the wind shield adjacent the annuli. The moisture inside the annulus is quickly driven out and the seeping of the heated air at the edge of the annulus clears the wind shield for some distance surrounding the annulus. The glass of the wind shield soon becomes warmed under the annulus and the heat is gradually conducted through the glass of the windshield sufficiently to clear any moisture or frost from the outer side of the wind shield.

Having thus described my invention in such full, clear, and exact terms that its construction and operation will be readily understood by others skilled in the art to which it pertains, what I claim as new and desire to secure by Letters Patent of the United States is:

1. A clear vision device for automobile windshields including a frame member, means for conducting heated air to the interior of said frame member, and a window in a side of said frame member, said means for conducting heated air being adapted to yieldably hold said frame member in intimate contact with the windshield of an automobile whereby the heated air will be forced out at the edge of said frame member contacting with the windshield.

2. A clear vision device for automobile windshields including a pair of frame members adapted to contact with an automobile windshield, windows in said frame members, said windows being spaced from the windshield, a Y-shaped tubular joint, a pair of tubular connectors between said joint and said pair of frame members, and a tubular connector adapted to receive heated air and to conduct the heated air through said joint to both of said frame members, said tubular conductors being resilient whereby said frame members are supported and yieldably held in contact with the windshield solely by said conductors.

In testimony whereof I affix my signature.

EDWARD A. KROH.